J. B. McCARTHY.
CONCENTRATOR.
APPLICATION FILED JAN. 12, 1920.
1,417,189.
Patented May 23, 1922.
5 SHEETS—SHEET 2.
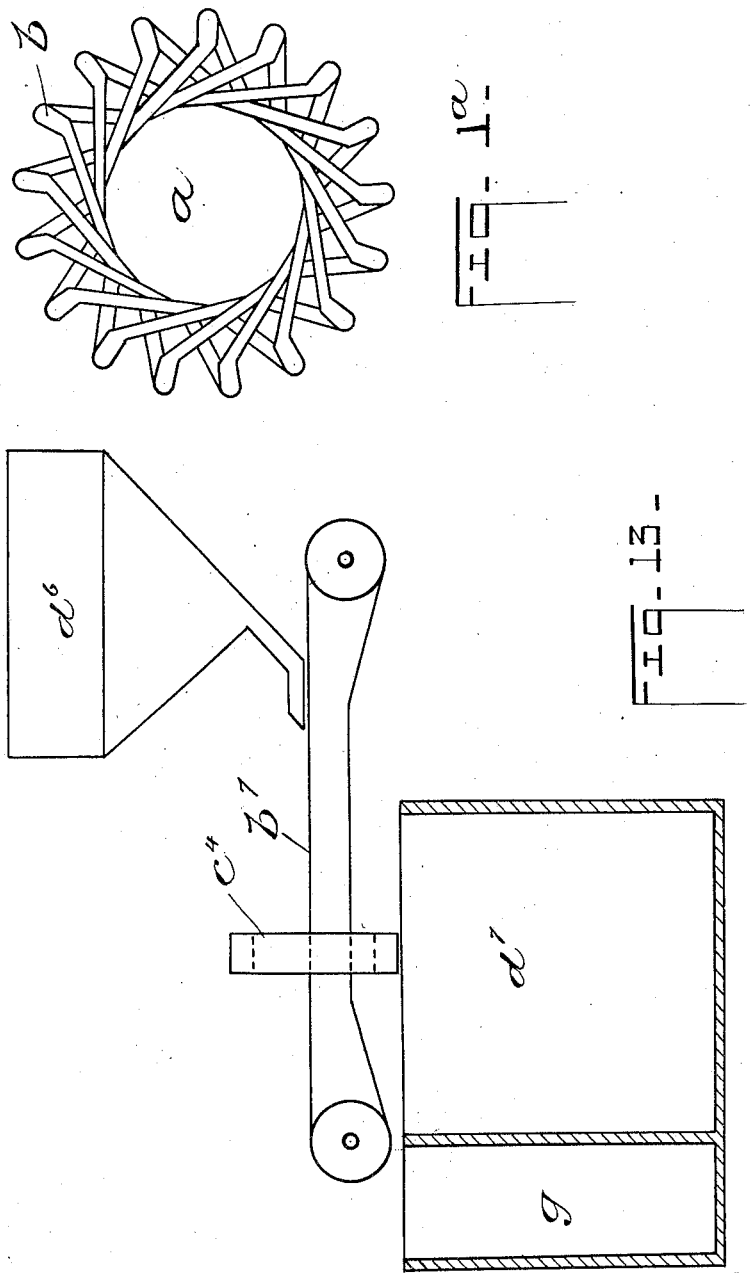
Inventor.
Joseph B. M?Carthy.
By Chas. H. Reiter
Atty.

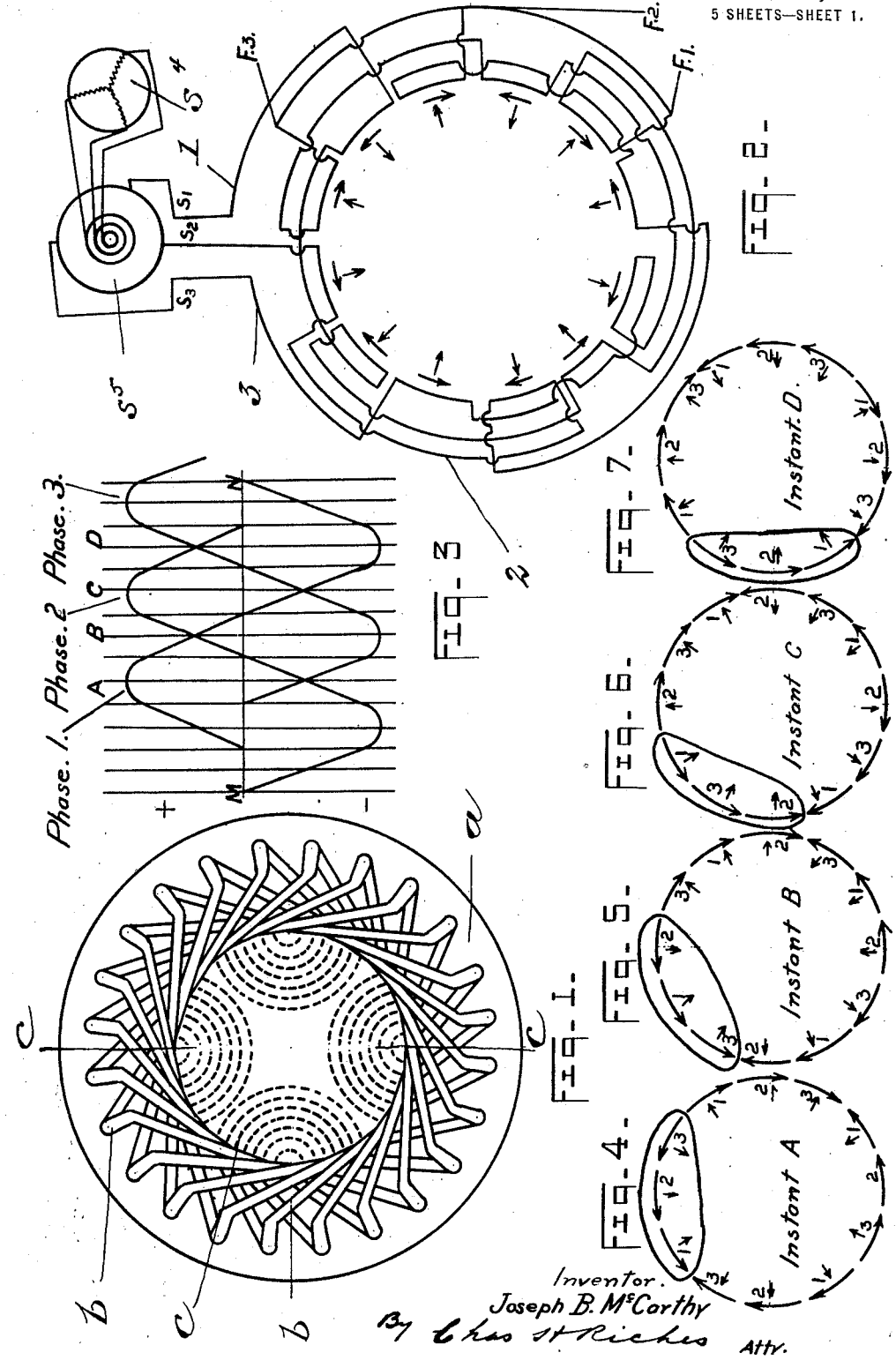

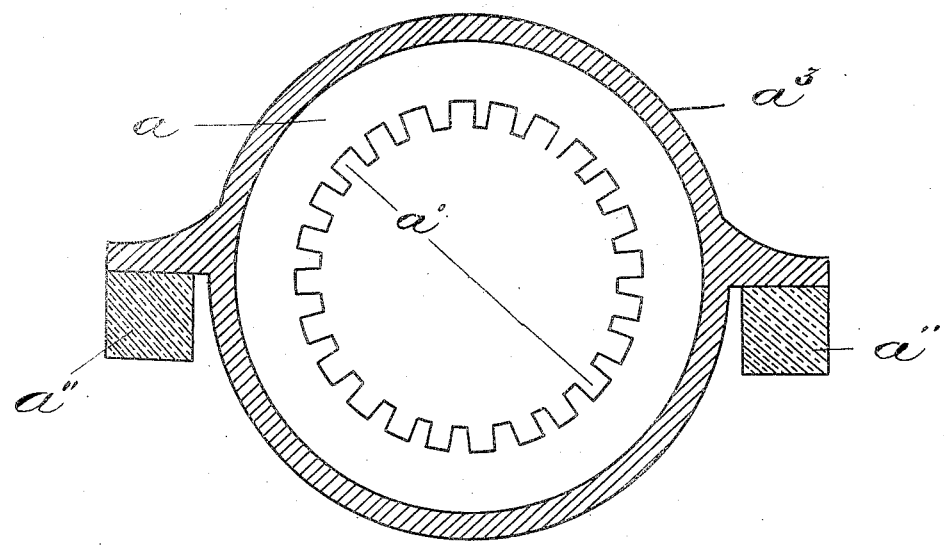
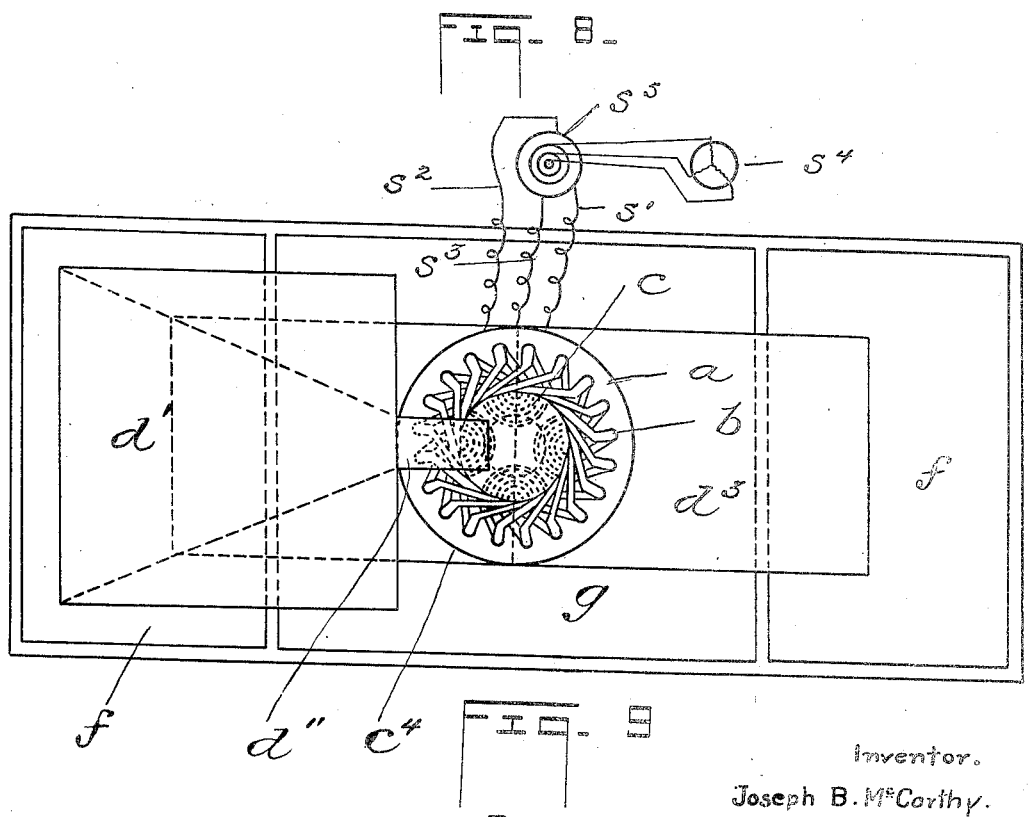

J. B. McCARTHY.
CONCENTRATOR.
APPLICATION FILED JAN. 12, 1920.
1,417,189.
Patented May 23, 1922.
5 SHEETS—SHEET 4.
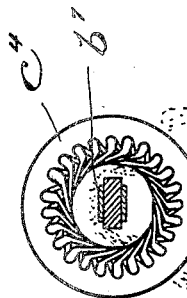
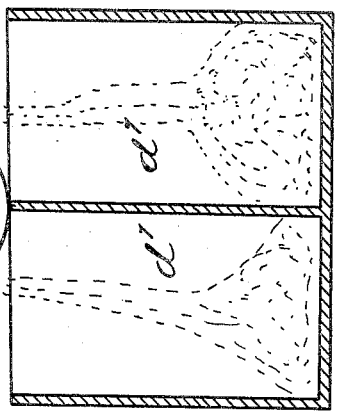
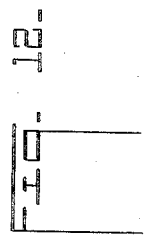
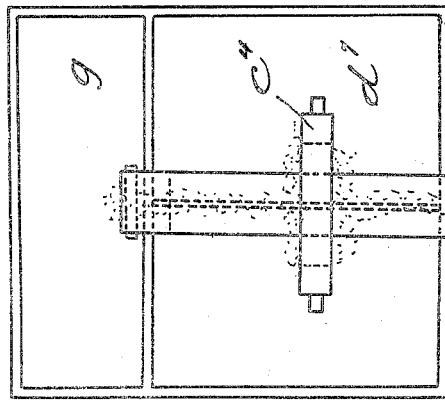
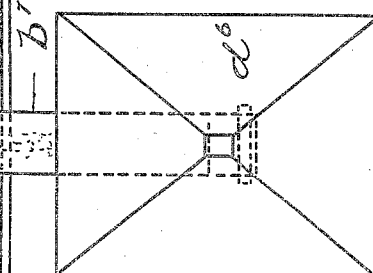
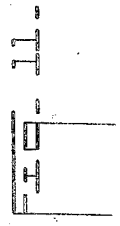
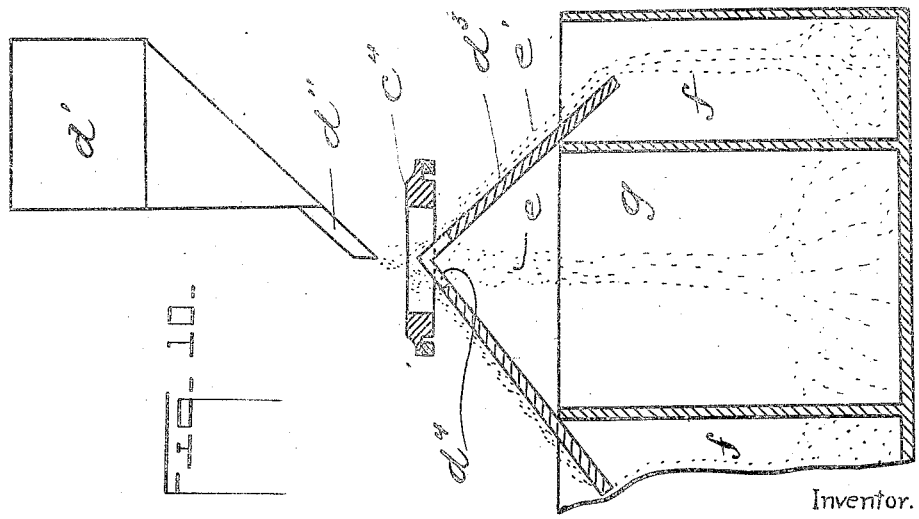
Inventor.
Joseph B. McCarthy
By Chas. H. Riches
Atty.

J. B. McCARTHY.
CONCENTRATOR.
APPLICATION FILED JAN. 12, 1920.
1,417,189.
Patented May 23, 1922.
5 SHEETS—SHEET 5.
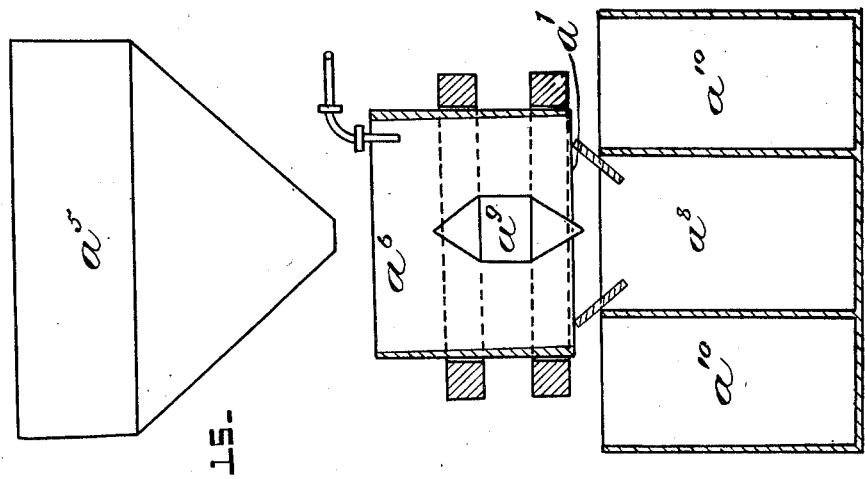
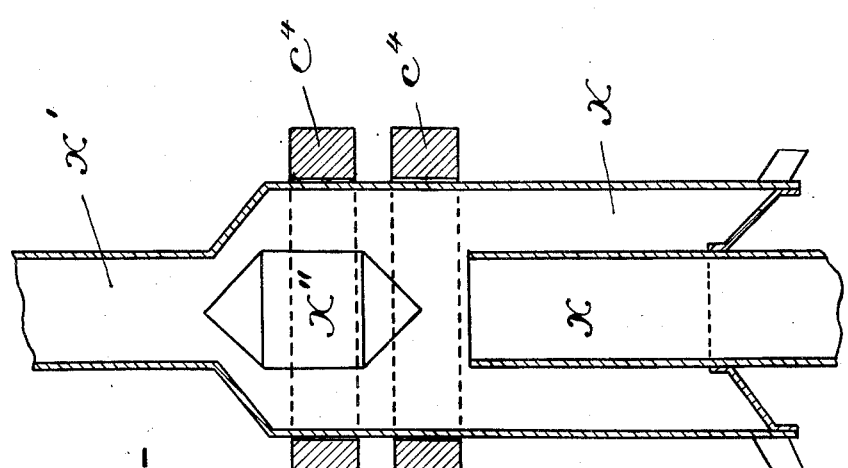
Inventor.
Joseph. B M$^c$Carthy.
By
Atty

UNITED STATES PATENT OFFICE.

JOSEPH BARTHOLEMEW McCARTHY, OF COPPER CLIFF, ONTARIO, CANADA.

CONCENTRATOR.

1,417,189.  Specification of Letters Patent.  Patented May 23, 1922.

Application filed January 12, 1920. Serial No. 351,049.

*To all whom it may concern:*

Be it known that I, JOSEPH BARTHOLEMEW McCARTHY, a citizen of the United States, residing at Copper Cliff, in the District of Sudbury and Province of Ontario, Dominion of Canada, have invented certain new and useful Improvements in Concentrators; and I hereby declare the following to be a full, clear, and exact description of the same.

The object of this invention is to physically concentrate matter consisting of constituents having different co-efficients of electrical conductivity, or having the same electrical co-efficients, but different magnetic or magnetizable properties, this object being attained by means of a moving magnetic field or plurality of fields, which may be produced in various ways, for instance by alternating current or currents flowing through specially arranged winding or windings, stationary with relation to the core, or by a system of mechanically moving permanent or electro magnets, or by other means within the scope of the appended claims.

I am aware that in the present state of the art there are magnetic separators or concentrators whose action depends on the particles to be separated being of a magnetic or magnetizable nature, but the commercial use of these concentrators is limited to the separation only of highly magnetic or magnetizable substances, and they are incapable of use under any other conditions. In the case of my invention, I do not rely upon the attractive force of the magnetic field, as understood as by the attraction of a piece of iron to a permanent magnet, to effect the concentration, as this force is merely one of the conditions resulting from the production of the moving field, but I do rely on the moving field to generate in the matter to be concentrated electric currents, which will react against the field, and set the constituents of the matter in motion, and cause each particle to tend to rotate on its own axis and gradually separate itself from the other particles, each particle while doing so, usually taking a path towards and along the core, and spinning on its own axis as it progresses, thereby effectually freeing itself from the other similar and dissimilar particles of the constituents.

In the drawings:

Fig. 1, is a conventional end view of a form of concentrating unit by which the above object may be accomplished showing the windings arranged internally of the core, Fig. 1ª, is a similar view to Fig. 1 showing the windings arranged externally of the core, Fig. 2, is a conventional diagrammatic view showing one arrangement of the windings, Fig. 3, is a fragmentary graph of polyphase alternating currents, illustrating the production of the moving magnetic field or fields, Figs. 4, 5, 6 and 7, are diagrammatic views showing the movement of the field, Fig. 8, is a sectional view of a suitable type of core and frame for the windings of the concentrating unit, Fig. 9, is a plan view of a concentrating apparatus constructed according to this invention, Fig. 10, is a sectional elevation of the construction shown in Fig. 9, Fig. 11, is a plan view of a modification of the construction shown in Figs. 9 and 10, Fig. 12, is a sectional elevation of the construction shown in Fig. 11, Fig. 13, is a side sectional elevation of the construction shown in Figs. 11 and 12, Fig. 14, is a sectional elevation of a concentrator for use in connection with matter associated with gases, and Fig. 15, is a sectional elevational view of a concentrator for use in connection with matter associated with liquids.

The term moving magnetic field hereinafter used is intended to include in its meaning any magnetic field which changes its position relative to the matter to be concentrated and thereby induces or tends to induce electric currents in the matter being concentrated. To produce this field various types of apparatus may be used, the preferred type comprising a metallic core, preferably constructed of laminated iron or steel plates or of solid iron or steel of any suitable shape and size, and a winding preferably arranged in groups of coils relatively stationary as regards the core.

As shown in Figs. 1 and 8, the core $a$ is cylindrical and its internal surface is slotted or apertured as at $a'$, to receive a winding $b$, the coils of which are distributed symmetrically around the internal face of the core and connected in a manner to form distinct groups, but as shown in Fig. 1$^a$ the winding may be distributed around the external face of the core.

This winding as shown in Fig. 2, is arranged in circuits suitable for the source of power to which it is to be connected, so that when alternating electromotive forces are applied a moving magnetic field or fields will result.

The arrangement of winding and grouping of coils may be designed for polyphase or combinations or modifications of single phase alternating current or currents.

The preferred general arrangement of the core and winding is as shown in the drawings and set forth in the following description, but while applying to a polyphase system it may be altered to apply to the general arrangement of a combination or modification of single phase systems.

As shown in Fig. 8, the core $a$ is contained in a frame $a^3$ mounted on a supporting structure $a''$ of any suitable material and mechanical strength. The slots or apertures $a'$ are equally spaced around its inner surface, but in the case of the construction of the core shown in Fig. 1$^a$, the slots or apertures are similarly arranged in its outer surface.

In the slots or apertures $a'$ is placed an insulated winding $b$, made up of coils of a shape ordinarily known to the art as "diamond coils". These coils are arranged in groups, indicated in Figs. 2 to 7 inclusive, as phases 1, 2 and 3. The purpose of this arrangement of the coils is to produce the moving magnetic field or fields.

It is not necessary, however, to use diamond shaped coils, as the winding may be any one of a number of types, and current at any frequency and voltage may be used with a properly designed winding and core, and the intensity of the magnetic field may be controlled preferably by varying the applied voltage impressed upon the winding.

To illustrate the action of the magnetic fields, Fig. 2 shows conventionally a 3 phase winding with four groups of coils per phase, the phases being spaced electrically 120° apart. $S^1$, $S^2$, $S^3$, represent the starts of the winding for the phases 1, 2 and 3, respectively and $F^1$, $F^2$ and $F^3$, represent the finishes of the winding for the phases 1, 2 and 3, respectively.

With the finishes $F^1$, $F^2$, and $F^3$, connected as shown, the winding of the 3 phase combination is arranged in what is designated in the art as "star", but it is not necessary to have this arrangement as other combinations of the winding may be used to accomplish the purpose.

Assuming that the current has a positive direction when it flows into phases 1, 2 and 3, and a negative direction when it flows out of them; then for the positive flow of the current in phases 1, 2 and 3, the magnetic field generated by such currents may be assumed to have a direction as indicated by the small arrows in Figs. 2 and 4 to 7 inclusive.

The currents flowing in the winding at any instant, are indicated by curves in Fig. 3, and marked phase 1, phase 2, phase 3, plotted on a time base M—N, the winding in Figs. 2, and 4 to 7 inclusive being marked 1, 2 and 3 to indicate the same phases.

Figs. 4, 5, 6 and 7, illustrate the essential features in the production of the magnetic field, for a 3 phase, 4 pole combination.

Fig. 2, shows conventionally the position of the winding on the core arranged in 3 parts, marked 1, 2 and 3, for phase 1, phase 2 and phase 3, respectively.

Referring to Fig. 3, and assuming the line M—N as the zero position, above M—N as positive, and below M—N as negative it will be noted that at instant A, the current, and thus the magnetizing forces in phase 1, are at their maximum value positive, while in phases 2 and 3 the current and thus the magnetizing forces is at one-half maximum value negative.

At instant B the current in phase 1 has decreased from maximum value positive to one-half maximum value positive, also, phase 2 has passed through zero, and is now one-half maximum value positive, while phase 3 has a maximum value negative.

At instant C, phase 2 has come to maximum value positive, while phases 1 and 3 are one-half maximum value negative.

At instant D, phase 1 is maximum value negative while phases 2 and 3 are one-half maximum value positive.

Each phase has thus completed one-half of a cycle that is to say phase 1 has moved from maximum value positive to maximum value negative, and phases 2 and 3 from one-half maximum value negative to one-half maximum value positive.

Keeping in mind the assumption that the currents are positive when they flow into the windings of phases 1, 2 and 3, then at instant A, the direction of the currents of these phases and the position of the resulting magnetic field $c$, is as indicated in Fig. 4.

At instant B, the direction of the current in one of the phases has changed, and the resulting magnetic field has shifted from the position in Fig. 4 to that of Fig. 5, and similarly at instants C and D, the direction of the currents and resulting magnetic fields have changed as indicated in Figs. 6 and 7 respectively.

It will be noted that in Figs. 4, 5, 6 and 7, the arrows indicate four groups and at each succeeding instant the direction of the arrows of one phase has changed, and the position of the magnetic field has moved or progressed a distance of thirty degrees.

It is plain from Fig. 3, that the magnetizing forces act together at some points and oppose at others, and that the position of the resulting magnetic field shifts or progresses in accordance with the frequency of the applied current, the speed at which the field moves depending on this frequency and the grouping of the coils.

With 60 cycle current applied to a 4 pole combination, the magnetic field would make 1800 revolutions per minute, but this number of revolutions can be stepped down or up by changing the winding or varying the frequency of the applied current and the above has been mentioned merely to illustrate the production of a moving field and the speed at which it may move.

The magnetic field induced as above described is projected into the space within the core in the construction shown in Fig. 1, or beyond the core in the construction shown in Fig. 1ª, and when the matter comes within the zone of action of the magnetic field, the electrically conducting constituents will tend to move toward the core $a$, the rapidity of their movement being dependent upon the intensity and speed of the magnetic field, which in turn are directly dependent upon the frequency and intensity of the applied current, and the grouping of the coils, and the nature of the core.

When an electrically conducting body is placed so that it comes under the influence of this moving field, it will be set in motion and tend to revolve about its axis, and if free to move and not located in a position of exact magnetic balance it will move in a direction or path created by the moving magnetic field and the currents induced thereby in said body.

The foregoing description applies more or less to one method for the production of moving magnetic fields, but other forms or combinations may be used and the winding may be arranged internally or externally of the core, and the matter to be treated presented to the magnetic field in accordance with the modified construction. Consequently it is not intended to limit the invention to any particular type of concentrator, or to any particular arrangement of winding or groupings of coils, or combination of windings and coils, as it is proposed to use such combinations and arrangements as may be best suited to the particular conditions and to the results dessired to be obtained from the apparatus for each installation.

It is necessary, however, to combine with the concentrating unit some means for bringing the matter to be treated within the zone of action of the magnetic field.

As shown in Figs. 9 and 10, this means may consist of an elevated bin $d'$, having a chute $d''$ by which the matter is delivered to the concentrating unit $c^4$, which in this case is horizontally arranged and of the type shown in Fig. 1, that is, it consists of a hollow core with the windings arranged internally. The matter passes downward from the bin through the concentrating unit $c^4$ and the magnetic field sets the matter in motion, as previously described while passing through it.

Below the center of the concentrating unit $c^4$, shown in Figs. 9 and 10, is the apex of a frusto conical divider board $d^3$. The matter to be treated is delivered by the chute $d''$ through the magnetic field, the electrically conducting particles being diverted by the moving magnetic field towards the core $a$, and the non-conducting paticles $e$ passing down through the concentrating unit and through opening $d^4$ in the top of the divider board into the bin $g$, the electrically conducting particles $e'$ when they have passed through the magnetic field, descending upon the divider board $d^3$ and then passing into the bins $f$.

In Figs. 11 to 13 inclusive, the matter to be treated is shown to be delivered from bin $d^6$ by means of a conveyor $b^7$ to the concentrating unit $c^4$, the electrically conducting particles being diverted as above described towards the core $a$ and delivered into the bin $d^7$ while the non-conducting particles pass into the bin $g$.

The apparatus shown in Fig. 14, is for the treatment of solids carried in gases and in this case the stack or flue $x$ is provided with a dust collecting chamber $x'$. Within this dust collecting chamber, and above the top of the stack or flue $x$ is a baffle $x''$. Surrounding the dust collecting chamber are concentrating units $c^4$ for creating the magnetic fields. As the gases with the dust therein pass upward through the dust collecting chamber the action of the magnetic fields effect a concentration of the metallics, which ultimately drop to the bottom of the dust collecting chamber. This is possible owing to the metallics having lost their velocity when retarded by the action of the magnetic fields.

In Fig. 15, is shown a suitable type of apparatus for concentrating metallics associated with liquids. In this case a storage tank $a^5$ is placed above the concentrating tank $a^6$, the bottom of which is formed with an aperture $a^7$. The liquid with the matter to be treated flows from the storage tank into the concentrating tank and the water and the non-metallics pass through the aperture $a^7$ to a storage tank $a^8$. Within the concentrating tank is a baffle $a^9$ to bring the matter within the zone of action of the magnetic field or fields. The action of the magnetic field on the metallics is that previously described, and these metallics when they have moved beyond the zone of action of the magnetic field pass through aperture $a^7$ to the bins $a^{10}$.

Instead of using means such as previously described for bringing the matter to be trated within the zone of action of the magnetic field, other means within the scope of the appended claims may be provided for maintaining it within the magnetic zone during the concentration.

To periodically interrupt the flow of current through the windings, the source of power $s^4$ for the starts $S^1$, $S^2$ and $S^3$, is provided with an automatically actuated circuit breaker or interrupting device $s^5$. The effect of this is that at intervals of more or less frequency the magnetic field is interrupted so that the metallics can positively pass out of the magnetic zone.

The term electrically conducting particles or matter herein used is intended to include in its meaning all material of greater or less electrical conductivity.

Having thus fully described my invention, what I claim as new and desire to secure by Letters Patent is:

1. In a concentrator, means for producing a continuous magnetic field moving in a definite path, and inducing or tending to induce electric currents in the matter being concentrated which will react against the field and set the constituents of the matter in motion and cause the metallic particles to rotate about their own axes and gradually separate themselves from the other constituents.

2. In a concentrator, means for producing a continuous magnetic field moving in a definite path, and inducing or tending to induce electric currents in the matter being concentrated which will react against the field and set the constituents of the matter in motion and cause the metallic particles to rotate about their own axes and gradually separate themselves from the other constituents, and means for presenting the matter to be treated within the zone thereof.

3. A concentrator comprising a core, and a winding therefor arranged in groups of coils for inducing a continuous magnetic field moving in a definite path, and inducing or tending to induce electric currents in the matter being concentrated which will react against the field and set the constituents of the matter in motion and cause the metallic particles to rotate about their own axes and gradually separate themselves from the other constituents.

4. A concentrator for physically concentrating matter comprising a cylindrical core and windings for the core arranged for polyphase or combinations or modifications of single phase alternating currents to produce a moving magnetic field progressing continuously in a definite path and generating, in the matter to be concentrated, electric currents which set the constituents of the matter in motion and cause each particle of matter to tend to rotate on its own axis and the metallics to positively separate themselves from the non-metallics and move in the path and direction of the moving magnetic field without being attracted by it.

5. A concentrator comprising a cylindrical core, coils distributed symmetrically around the face of the core and connected in a manner to form distinct groups, the windings for which are arranged in circuits to create a moving magnetic field progressing continuously in a definite path, and means for conveying the matter, to be treated, through the zone of the magnetic field, whereby electric currents will be generated to set the constituents of the matter in motion and cause each particle of matter to tend to rotate on its own axis and the metallics to positively separate themselves from the non-metallics and move in the path or direction of the moving magnetic field without being attracted by it.

Toronto, Ontario, December 8th, 1919.

JOSEPH BARTHOLEMEW McCARTHY.

Signed in the presence of—
 CHAS. H. RICHES,
 W. J. GILCHRIST.